Patented Mar. 19, 1946

2,397,014

UNITED STATES PATENT OFFICE 2,397,014

CYANINE DYESTUFFS

John David Kendall, Ilford, England, assignor to Ilford Limited, Ilford, England, a company of Great Britain No Drawing. Application February 16, 1942, Serial No. 431,166. In Great Britain April 7, 1941

11 Claims. (Cl. 260—240)

This invention relates to the manufacture of dyestuffs and particularly to the manufacture of dyestuffs capable of optically sensitising silver halide photographic emulsions.

According to the present invention dyestuffs are produced by condensing about three molecular equivalents of an alkyl or aralkyl quaternary salt of a heterocyclic nitrogen compound containing a reactive methyl or mono-substituted methyl group in the α or γ position to the quaternary nitrogen atom with about one molecular equivalent of a compound of the formula:

where the groups $R_2$ are hydrocarbon residue e. g. akyl, aryl or aralkyl groups.

The course of the reaction is believed to be as follows:

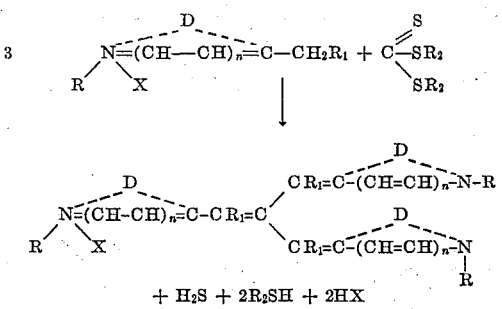

In this equation, D represents the residue of a heterocyclic nitrogen compound, R represents an alkyl or aralkyl group, $R_1$ represents a hydrogen atom or an alkyl, aryl or aralkyl group, $R_2$ represents an alkyl, aryl or aralkyl group, X represents an acid group (e. g. chloride, bromide, iodide, alkyl or aralkyl sulphate, p-toluene sulphonate or perchlorate) and n is nought or 1. In some instances the reaction does not proceed to the trinuclear stage as evidenced by the following examples and dinuclear products are obtained which contain a central $SR_2$ substituent.

The reaction may be carried out by heating the quaternary salt with the trithiocarbonate reagent, preferably in the presence of a base and a solvent. A solution of sodium acetate in ethyl alcohol is suitable, or organic bases may be used, e. g. piperidine, triethylamine and triethanolamine. Pyridine is of particular value in that it serves as both base and solvent.

Preferably, however, the dyestuff is initially obtained as a p-toluene sulphonte quaternary salt or as an alkyl or aralkyl sulphate quaternary salt by fusing the heterocyclic nitrogen base with the trithiocarbonate reagent and an alkyl or aralkyl-p-toluene sulphonte, or alkyl or aralkyl sulphate, thus converting the heterocyclic base to the corresponding quaternary salt in situ. Advantageously, in order to obtain the best yield the fused mass is heated with pyridine prior to separation of the dyestuff. If the final dyestuff is required as a salt other than a p-toluene sulphonate it may be converted into such other salt by treatment with a solution of an appropriate alkali salt, e. g. potassium chloride, potassium bromide or potassium iodide.

Any of the known types of heterocyclic quaternary ammonium compounds containing the specified reactive methyl group previously described for use in the manufacture of cyanine dyes may be employed in the process of the present invention. Examples are the substituted and unsubstituted thiazoles, oxazoles, selenazoles and their polycyclic homologues such as those of the benzene, naphthalene, acenaphthene and anthracene series; pyridine and its polycyclic holomogues such as quinoline and α and β naphthaquinolines; lepidines; indolenines; diazines; such as pyrimidines and quinazolines; diazoles (e. g. thio-ββ'-diazole), oxazolines, thiazolines and selenazolines. The polycyclic compounds of these series may also be substituted in the carbocyclic rings with one or more groups such as alkyl, aryl, amino, hydroxy, alkoxy and methylene dioxy groups, or by halogen atoms.

In the foregoing formulae the groups R and $R_1$ may be alkyl groups and examples are the methyl, ethyl, propyl and higher alkyl groups, allyl and similar unsubstitued groups, or they may be aralkyl groups, e. g. benzyl groups; $R_1$ may be an aryl group, e. g. a phenyl or naphthyl group.

The following examples illustrate the invention but are not to be regarded as limiting it in any way.

Example I

Preparation of the dyestuff of the probable formula:

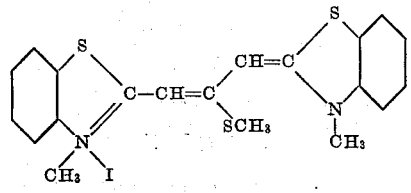

4.5 gms. of 1-methyl benzthiazole, 5.7 gms. of methyl-p-toluene sulphonate and 1.38 gms. of dimethyl trithiocarbonate were fused for three hours at 140–150° C. The fused product was mixed with 30 ccs. of pyridine and the mixture boiled for forty minutes. The mixture was then poured into an aqueous/alcoholic solution of potassium iodide, whereupon the product precipitated out. The product was recrystallised from methyl alcohol and was obtained as a dark red solid, melting at 248° C.

*Example II*

Preparation of the dyestuff of the probable formula:

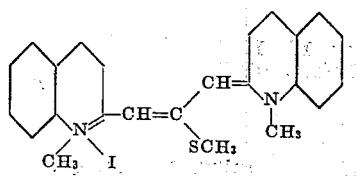

The process was carried out as in Example I using 4.3 gms. of quinaldine, 5.7 gms. of methyl-p-toluene sulphonate and 1.38 gms. of dimethyl trithiocarbonate. The product was obtained as a green dye melting at 277° C.

*Example III*

Preparation of the dyestuff of the probable formula:

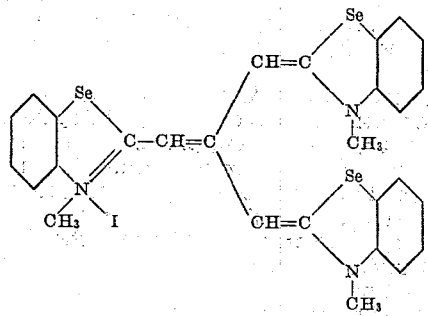

The process was carried out as in Example I using 6 gms. of 1-methyl benzselenazole, 5.7 gms. of methyl-p-toluene sulphonate and 1.38 gms. of dimethyl trithiocarbonate. The product obtained had a melting point of 240° C.

*Example IV*

Preparation of the dyestuff of the probable formula:

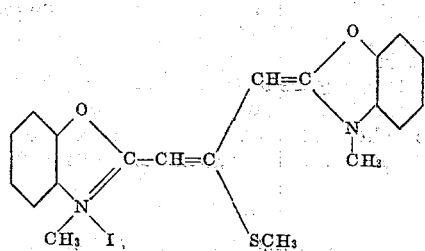

The process was carried out as in Example I using 4.0 gms. of 1-methyl benzoxazole, 5.7 gms. of methyl-p-toluene sulphonate and 1.38 gms. of dimethyl trithiocarbonate. The product was obtained as an orange solid, melting at 278° C.

*Example V*

Preparation of the dyestuff of probable formula:

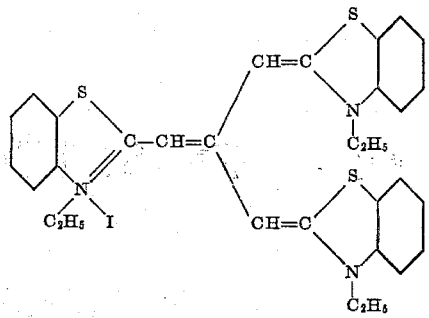

The process was carried out as in Example I using 4.5 gms. of 1-methyl benzthiazole, 6.0 gms. of ethyl-p-toluene sulphonate and 1.38 gms. of dimethyl trithiocarbonate. The product was obtained as a green dye having a melting point of 197° C.

*Example VI*

Preparation of the dyestuff of probable formula:

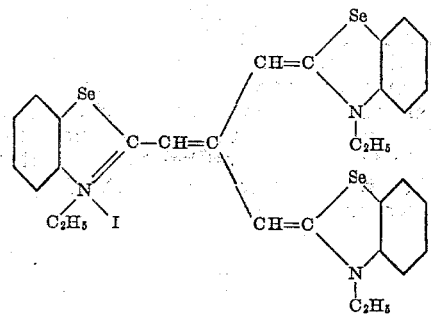

The process was carried out as in Example I using 6.0 gms. of 1-methyl benzselenazole, 6.0 gms. of ethyl-p-toluene sulphonate and 1.38 gms. of dimethyl trithiocarbonate. The product was obtained as a brownish coloured dye softening at 148° C. and melting at 220° C.

*Example VII*

Preparation of the dyestuff of probable formula:

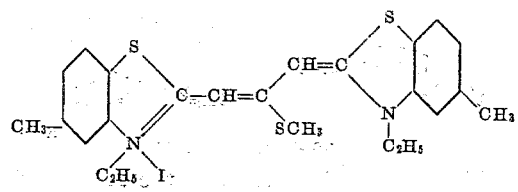

The process was carried out as in Example I using 4.95 gms. of 1:4-dimethyl benzthiazole, 6.0 gms. of ethyl-p-toluene sulphonate and 1.38 gms. of dimethyl trithiocarbonate. The product was obtained as a green dye having a melting point of 234° C.

*Example VIII*

Preparation of the dyestuff of probable formula:

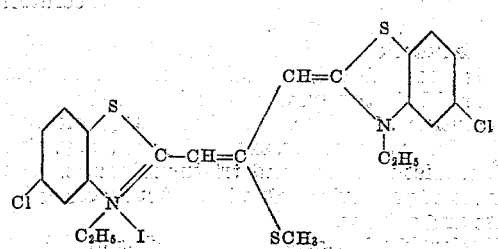

The process was carried out as in Example I using 5.5 gms. of 1-methyl-4-chlorobenzthiazole, 6.0 gms. of ethyl-p-toluene sulphonate and 1.38 gms. of dimethyl trithiocarbonate. The product was obtained as a brown dye having a melting point of 233° C.

*Example IX*

Preparation of the dyestuff of probable formula:

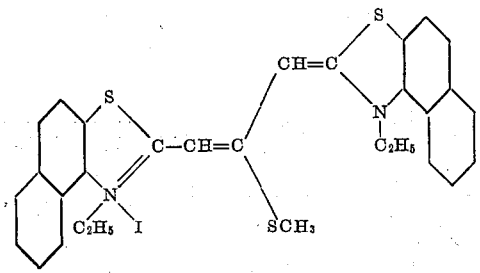

6.0 gms. of 1-methyl-β-naphthiazole and 6.0 gms. of ethyl-p-toluene sulphonate were fused for four hours at 180° C. To the fused product was then added 1.38 gms. of dimethyl trithiocarbonate and the mixture re-fused for three hours at 140° C. The fused mass was then mixed with 30 ccs. of pyridine and boiled for forty minutes, after which the mixture was poured into an aqueous solution of potassium iodine. A tar-like mass separated out, which, after triturating with benzene followed by recrystallisation from methyl alcohol, yielded the product as a dark green dye melting at 229° C.

Many of the dyestuffs produced according to the present invention are valuable sensitising dyes for photographic silver halide emulsions. Thus, for example, incorporated in a gelatin silver iodobromide emulsion, the product of Example I extends the sensitivity of the emulsion to about 6800 Å., the product of Example III extends the sensitivity of the emulsion to about 6600 Å. with a maximum at about 6100 Å., the product of Example VII extends the sensitivity of the emulsion to about 6600 Å. with a maximum at about 6000 Å. and the product of Example VIII extends the sensitivity of the emulsion to about 6600 Å. with a maximum at about 6100 Å.

The dyestuffs may be employed for sensitising any type of gelatino silver halide emulsion, e. g. silver chloride, silver bromide, silver chlorobromide and silver iodobromide emulsions. The quantity of dyestuff employed for sensitising will, of course, vary with the particular dye and the purpose for which the emulsion is intended. In general, for a typical emulsion containing the equivalent of 2% silver calculated as metal, the proportion may range between 250–1250 ccs. of a 1 in 2,000 solution per litre of emulsion.

What I claim is:

1. A process for the manufacture of dyestuffs which comprises condensing, by heating together, about three molecular equivalents of a compound selected from the group consisting of alkyl and aralkyl quaternary salts of heterocyclic nitrogen compounds of the type commonly employed in cyanine dyes containing in one of the α and γ positions to the quaternary nitrogen atom a reactive group selected from the group consisting of methyl and mono-substituted methyl groups, with about one molecular equivalent of a compound of the general formula:

where the groups $R_2$ are hydrocarbon radicals.

2. A process for the manufacture of dyestuffs which comprises condensing, by heating together, about three molecular equivalents of a heterocyclic nitrogen compound of the type commonly employed in cyanine dyes containing in one of the α and γ positions to the heterocyclic nitrogen atom a reactive group selected from the group consisting of methyl and mono-substituted methyl groups, with about one molecular equivalent of a compound of the general formula:

where the groups $R_2$ are hydrocarbon radicals, in in the presence of sufficient of a salt selected from the group consisting of alkyl and aralkyl salts to convert the said heterocyclic compound to a quaternary nitrogen salt.

3. A process for the manufacture of dyestuffs which comprises condensing, by heating together, about three molecular equivalents of a heterocyclic nitrogen compound of the type commonly employed in cyanine dyes containing in one of the α and γ positions to the heterocyclic nitrogen atom a reactive group selected from the group consisting of methyl and mono-substituted methyl groups, with about one molecular equivalent of a compound of the general formula:

where the groups $R_2$ are hydrocarbon radicals, in the presence of sufficient of an alkyl-p-toluene sulphonate to convert the said heterocyclic compound to a quaternary nitrogen salt.

4. A process for the manufacture of dyestuffs which comprises condensing, by heating together, about three molecular equivalents of a heterocyclic nitrogen compound of the type commonly employed in cyanine dyes containing in one of the α and γ positions to the heterocyclic nitrogen atom a reactive group selected from the group consisting of methyl and mono-substituted methyl groups, with about one molecular equivalent of a compound of the general formula:

where the groups $R_2$ are hydrocarbon radicals, in the presence of sufficient of a salt selected from the group consisting of alkyl and aralkyl salts to convert the said heterocyclic compound to a quaternary nitrogen salt, and completing the condensation by heating the reactants in the presence of a base.

5. A process for the manufacture of dyestuffs which comprises condensing, by heating together, about three molecular equivalents of a heterocyclic nitrogen compound of the type commonly employed in cyanine dyes containing in one of the α and γ positions to the heterocyclic nitrogen atom a reactive group selected from the group consisting of methyl and mono-substituted methyl groups, with about one molecular equivalent of a compound of the general formula:

where the groups $R_2$ are hydrocarbon radicals, in the presence of sufficient of an alkyl-p-toluene sulphonate to convert the said heterocyclic compound to a quaternary nitrogen salt, and completing the condensation by heating the reactants in the presence of a base.

6. A process for the manufacture of dyestuffs which comprises condensing, by heating together, about three molecular equivalents of a compound selected from the group consisting of alkyl and aralkyl quaternary salts of a polycyclic azole selected from the group consisting of oxazoles, thiazoles and selenazoles containing aromatic rings fused to the azole rings and having in the α position to the quaternary nitrogen atom a reactive group selected from the group consisting of methyl and mono-substituted methyl groups, with about one molecular equivalent of a compound of the general formula:

where the groups $R_2$ are hydrocarbon radicals.

7. A process for the manufacture of dyestuffs which comprises condensing, by heating together, about three molecular equivalents of a polycyclic azole selected from the group consisting of oxazoles, thiazoles and selenazoles containing aromatic rings fused to the azole rings and having in the α position to the heterocyclic nitrogen atom a reactive group selected from the group consisting of methyl and mono-substituted methyl groups, with about one molecular equivalent of a compound of the general formula:

where the groups $R_2$ are hydrocarbon radicals, in the presence of sufficient of a salt selected from the group consisting of alkyl and aralkyl salts to convert the said polycyclic azole to a quaternary nitrogen salt.

8. A process for the manufacture of dyestuffs which comprises condensing, by heating together, about three molecular equivalents of a compound selected from the group consisting of alkyl and aralkyl quaternary salts of heterocyclic nitrogen compounds of the type commonly employed in cyanine dyes containing in one of the α and γ positions to the quaternary nitrogen atom a reactive group selected from the group consisting of methyl and mono-substituted methyl groups, with about one molecular equivalent of a compound of the general formula:

where the groups $R_2$ are hydrocarbon radicals, the condensation being effected in the presence of a base.

9. A dyestuff of the formula:

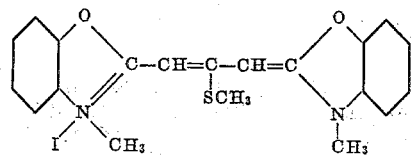

10. A dyestuff of the formula:

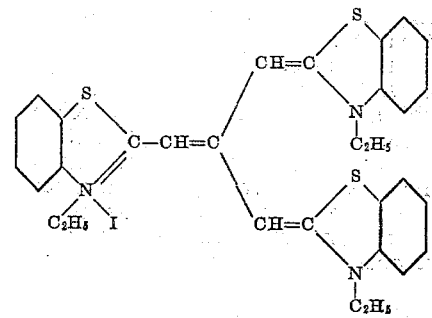

11. A dyestuff of the formula:

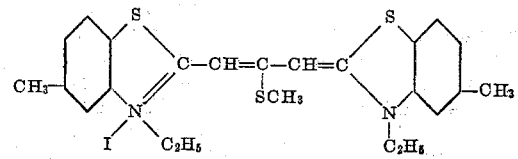

JOHN DAVID KENDALL.